US010454560B2

(12) United States Patent
Nilsson et al.

(10) Patent No.: US 10,454,560 B2
(45) Date of Patent: Oct. 22, 2019

(54) BEAM MANAGEMENT SYSTEMS AND METHODS

(71) Applicant: TELEFONAKTIEBOLAGET LM ERICSSON (PUBL), Stockholm (SE)

(72) Inventors: Andreas Nilsson, Göteborg (SE); Fredrik Athley, Kullavik (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/541,096

(22) PCT Filed: Jun. 5, 2017

(86) PCT No.: PCT/EP2017/063603
§ 371 (c)(1),
(2) Date: Jun. 30, 2017

(87) PCT Pub. No.: WO2018/224119
PCT Pub. Date: Dec. 13, 2018

(65) Prior Publication Data
US 2018/0351630 A1 Dec. 6, 2018

(51) Int. Cl.
*H04B 7/06* (2006.01)
*H04B 7/08* (2006.01)
*H04B 7/0426* (2017.01)
*H04B 7/0452* (2017.01)
*H04B 7/0417* (2017.01)

(52) U.S. Cl.
CPC ......... *H04B 7/0857* (2013.01); *H04B 7/0426* (2013.01); *H04B 7/0452* (2013.01); *H04B 7/0617* (2013.01); *H04B 7/088* (2013.01); *H04B 7/0417* (2013.01)

(58) Field of Classification Search
CPC .. H04B 7/0857; H04B 7/0426; H04B 7/0617; H04B 7/0417
See application file for complete search history.

(56) References Cited

U.S. PATENT DOCUMENTS

| 2013/0072243 | A1* | 3/2013 | Yu | H04B 7/0695 455/509 |
| 2013/0215844 | A1* | 8/2013 | Seol | H04W 72/046 370/329 |
| 2015/0282001 | A1 | 10/2015 | Kwak et al. | |
| 2015/0282122 | A1 | 10/2015 | Kim | |

(Continued)

OTHER PUBLICATIONS

International Search Report with Written Opinion issued in Application No. PCT/EP2017/063603 dated Feb. 9, 2018, 14 pages.

*Primary Examiner* — Kenneth T Lam
(74) *Attorney, Agent, or Firm* — Rothwell, Figg, Ernst & Manbeck, P.C.

(57) ABSTRACT

A UE RX beam training procedure in which a user equipment (UE) is configured with "interference" information indicating one or more reference signals (RSs) that the UE should consider as interference. For example, it is proposed here to include such interference information in a transmitted beam training configuration for a UE RX beam training procedure to be performed by the UE. An advantage with these proposals is that the UE RX beam can be determined not only on maximizing received power, but also by taking predicted interference in to account, which can lead to a higher quality of service and/or a higher throughput.

25 Claims, 9 Drawing Sheets (56) References Cited

U.S. PATENT DOCUMENTS

| | | | |
|---|---|---|---|
| 2015/0341095 A1* | 11/2015 | Yu | H04B 7/0619 |
| | | | 370/252 |
| 2016/0337879 A1* | 11/2016 | Hwang | H04B 17/336 |
| 2017/0104517 A1* | 4/2017 | Kakishima | H04B 7/0456 |
| 2017/0207845 A1* | 7/2017 | Moon | H04B 7/088 |
| 2017/0346545 A1* | 11/2017 | Islam | H01Q 1/245 |
| 2018/0132217 A1* | 5/2018 | Stirling-Gallacher | |
| | | | H04B 7/0417 |
| 2018/0183507 A1* | 6/2018 | Franz | H04B 7/0626 |
| 2018/0205483 A1* | 7/2018 | Nagaraja | H04B 7/0617 |
| 2018/0220398 A1* | 8/2018 | Wilson | H04B 17/318 |

\* cited by examiner

BEAM MANAGEMENT SYSTEMS AND METHODS

CROSS REFERENCE TO RELATED APPLICATION(S)

This application is a 35 U.S.C. § 371 National Stage of International Patent Application No. PCT/EP2017/063603, filed Jun. 5, 2017, designating the United States, which is incorporated by reference.

TECHNICAL FIELD

Disclosed are embodiments for beam management.

BACKGROUND

The next generation mobile wireless communication system, which is referred to as "5G," will support a diverse set of use cases and a diverse set of deployment scenarios. 5G will encompass an evolution of today's 4G networks and the addition of a new, globally standardized radio-access technology known as "New Radio" (NR).

The diverse set of deployment scenarios includes deployment at both low frequencies (100s of MHz), similar to LTE today, and very high frequencies (mm waves in the tens of GHz). At high frequencies, propagation characteristics make achieving good coverage challenging. One solution to the coverage issue is to employ beamforming (e.g., high-gain beamforming) to achieve satisfactory link budget.

Beamforming (a.k.a., precoding) is an important technology in future radio communication systems. It can improve performance both by increasing the received signal strength, thereby improving the coverage, and by reducing unwanted interference, thereby improving the capacity. Beamforming can be applied both in a transmitter and a receiver.

In a transmitter, beamforming involves configuring the transmitter to transmit the signal in a specific direction (or a few directions) and not in other directions. In a receiver, beamforming involves configuring the receiver to receive signals from a certain direction (or a few directions) and not from other directions. When beamforming is applied in both the transmitter and the receiver for a given communication link, the combination of the beam used by the transmitter to transmit a signal to the receiver and the beam used by the receiver to receive the signal is referred to as a beam-pair link (BPL). Generally, the beamforming gains are related to the widths of the used beams: a relatively narrow beam provides more gain than a wider beam. A BPL can be defined for downlink (DL) and uplink (UL) separately or jointly based on reciprocity assumptions.

For a more specific description of beamforming, one typically talks about beamforming weights rather than beams. On the transmission side, the signal to be transmitted is multiplied with beamforming weights (e.g., complex constants) before being distributed to the individual antenna elements. There is a separate beamforming weight for each antenna element, which allows maximum freedom in shaping the transmission beam given the fixed antenna array. Correspondingly, on the receiving side, the received signal from each antenna element is multiplied separately with the beamforming weights before the signals are combined. However, in the context of the present text, the description is easier to follow if the somewhat simplified notion of beams, pointing in certain physical directions, is adopted.

Beamforming generally requires some form of beam management, such as beam search, beam refinement, and/or beam tracking, to determine what UL and/or DL transmit (TX) and receive (RX) beams to use for communication between two units. Typically, the two units are a radio access network (RAN) transmission and reception point (TRP) (e.g., a base station) and a user equipment (UE) (i.e., a device, such as, for example, a tablet, a smartphone, a sensor, a smart appliance (or other Internet-of-Things (IoT) device), etc., that is capable of wireless communication with a TRP).

Generally, beam search is used to discover and maintain BPLs. A BPL is expected to be discovered and monitored by the network using measurements on downlink reference signals (RSs) used for beam management, such as channel state information (CSI) reference signals (CSI-RS). The CSI-RS for beam management can be transmitted periodically, semi-persistently or aperiodic (such as being event triggered) and they can be either shared between multiple UEs or be UE-specific. In order to find a suitable TRP TX beam the TRP transmits CSI-RS in different TRP TX beams on which the UEs performs reference signal received power (RSRP) measurements to produce a CSI-RSRP value, as is well known in the art, and reports back the N best TRP TX beams (where the value of N can be configured by the network). Furthermore, the CSI-RS transmission on a given TRP TX beam can be repeated to allow the UE to evaluate suitable UE RX beams, thus enabling so-called UE RX beam training. The TRP can setup a beam training procedure with a UE by transmitting a beam training configuration.

Multi-user Multiple-Input Multiple-Output (MU-MIMO) is foreseen to be a key technical component in 5G. The purpose of MU-MIMO is to serve multiple UEs simultaneously in the same time, frequency, and code resources and in this way increase the capacity in the system. It is expected that proper beamforming settings at the UE largely can improve the performance for MU-MIMO.

SUMMARY

During conventional UE RX beam training it is expected that the UE RX beam will be determined by selecting the RX beam that produces the highest RSRP measurement with respect to an RX beam training reference signal transmitted to the UE (e.g., transmitted to the UE using a TRP TX beam selected for the UE). For MU-MIMO, however, it may be sub-optimal to select the UE RX beam based solely on the RSRP of the reference signal because, in MU-MIMO, the inter-user interference can be rather large. Accordingly, it is advantageous for a first UE to consider not only the power level of the beam training reference signal, but also to consider the interference that is caused by a reference signal transmitted to a second UE (e.g., a UE neighboring the first UE).

Hence, it is proposed here to configure a UE with "interference" information indicating one or more reference signals that the UE should consider as interference. For example, it is proposed here to include such interference information in a transmitted beam training configuration for a UE RX beam training procedure to be performed by the UE. An advantage with these proposals is that the UE RX beam can be determined not only on maximizing received power, but also by taking predicted interference in to account, which can lead to a higher quality of service and/or a higher throughput.

Accordingly, in one aspect there is provided method for beam management that is performed by a network node (e.g., a network node comprising a TRP). The method includes the network node determining a first transmit (TX)

beam for use in communicating with a first UE. The method also includes the network node determining a second TX beam for use in communicating with a second UE. The method further includes transmitting to the first UE a first message (e.g., a beam training configuration message) comprising information that a) identifies a resource that is used to transmit a reference signal (RS2) (e.g., a CSI-RS) and causes the first UE to treat RS2 as an interfering signal.

In some embodiments, the first message further comprises information that a) identifies a resource that is used to transmit another RS (RS1) and b) causes the first UE to not treat RS1 as an interfering signal (i.e., treat it as the "desired" signal). In some embodiments, the first message is one of: i) a first downlink control information (DCI) message transmitted using a physical downlink control channel (PDCCH) ii) a first Radio Resource Control (RRC) message, and iii) a first Media Access Control (MAC) message.

In some embodiments, the method also includes transmitting to the second UE a second message comprising information that a) identifies the resource that is used to transmit RS1 and b) causes the second UE to treat RS1 as an interfering signal. In some embodiments, the second message further comprises information that a) identifies the resource that is used to transmit RS2 and b) causes the second UE to not treat RS2 as an interfering signal.

In some embodiments, the method also includes transmitting RS1 using the first TX beam and transmitting RS2 using the second TX beam, wherein the RS1 and RS2 are transmitted in the same symbol.

In another aspect there is provided a method for beam management performed by a UE. The method includes the UE receiving a message comprising information that a) identifies a resource that is used to transmit a reference signal (RS2) (e.g., a CSI-RS) and b) causes the first UE to treat RS2 as an interfering signal. The method also includes, during a first period of time, receiving RS2 and a another RS (RS1) using a first RX beam, wherein during the first time period a first TX beam was used to transmit RS1 and a second TX beam was used to transmit RS2 The method further includes, during a second period of time, receiving RS1 and RS2 using a second RX beam, wherein during the second time period the first TX beam was used to transmit RS1 and the second TX beam was used to transmit RS2.

In some embodiments, the message further comprises information that a) identifies a resource that is used to transmit RS1 and b) causes the first to not treat RS1 as a interfering signal. In some embodiments, the message is one of: i) a first downlink control information message transmitted using a physical downlink control channel, ii) a first Radio Resource Control message, and iii) a first Media Access Control message.

In some embodiments, the method further includes: producing a first power value (P1) indicative of the power of RS1 received using the first RX beam; producing a second power value (P2) indicative of the power of RS2 received using the first RX beam; calculating a first value (V1) using P1 and P2 as inputs to the calculation; and selecting an RX beam from a set of candidate RX beams using the calculated first value (V1), wherein said set of candidate RX beams includes the first RX beam.

In some embodiments, the method further includes producing a third power value (P3) indicative of the power of RS1 received using the second RX beam; producing a fourth power value (P4) indicative of the power of RS2 received using the second RX beam; calculating a second value (V2) using P3 and P4 as inputs to the calculation; and selecting an RX beam from a set of candidate RX beams using both V1 and V2, wherein said set of candidate RX beams further includes the second RX beam. In some embodiments, selecting an RX beam from the set of candidate RX beams using both V1 and V2 comprises comparing V1 with V2. In some embodiments, calculating V1 comprises calculating V1=P1/(P2+N1), wherein N1 is a determined noise value and N1 is greater than or equal to zero; and calculating V2 comprises calculating V2=P3/(P4+N2), wherein N2 is a determined noise value and N2 is greater than or equal to zero. That is, in some embodiments, each of V1 and V2 is an SINR value. In some embodiments, the power values (P1-P4) produced by the UE are RSRP values. That is, for example, the UE produces P1 by determining the RSRP of RS1 and produces P2 by determining the RSRP of RS2.

In some embodiments, selecting an RX beam from the set of candidate RX beams using both V1 and V2 comprises: comparing V1 with V2 to determine which is greater; and performing one of: i) selecting the first RX beam as a result of determining that V1 is greater than V2 and ii) selecting the second RX beam as a result of determining that V2 is greater than V1.

BRIEF DESCRIPTION OF THE DRAWINGS

The accompanying drawings, which are incorporated herein and form part of the specification, illustrate various embodiments.

DETAILED DESCRIPTION

Figure 1:
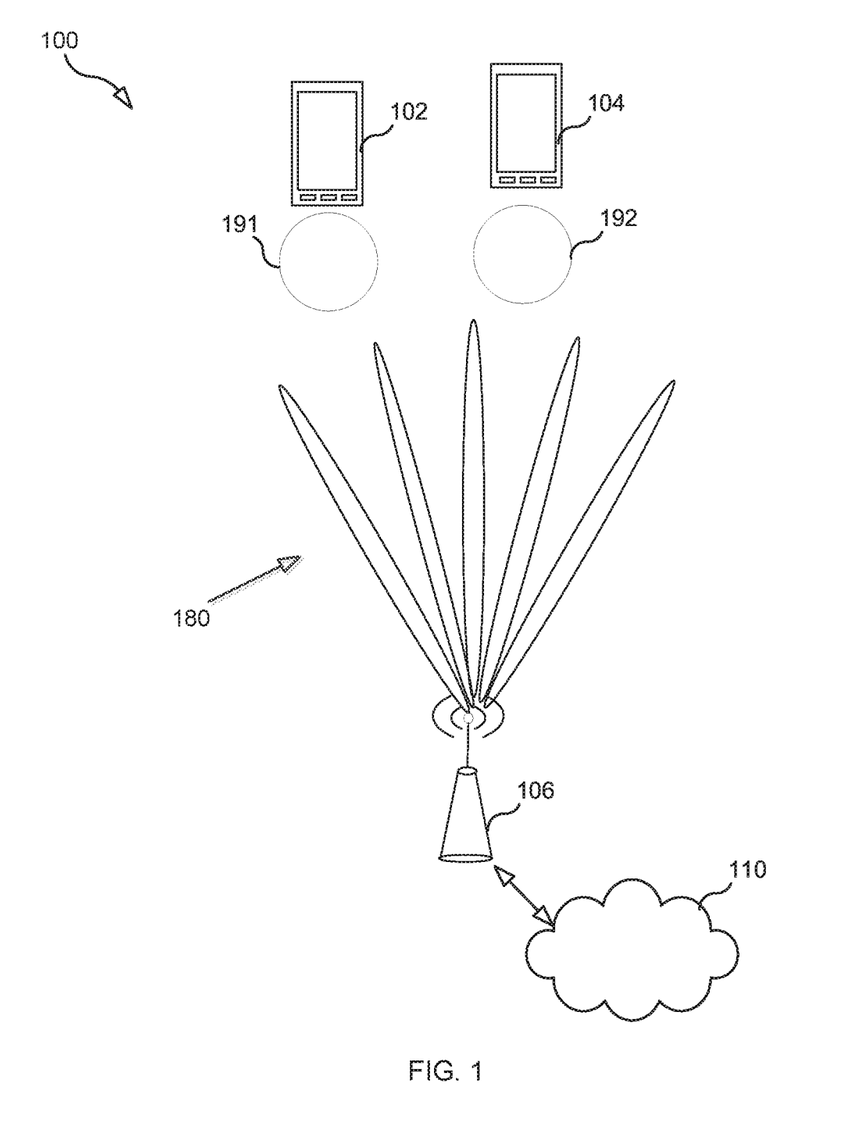
FIG. 1 illustrates a system according to one embodiment.

FIG. 1 illustrates a system 100 according to an exemplary use case, which system includes a network node 106 (which is also referred to as TRP 106) that communicates wirelessly with UEs 102 and 104 and provides UEs 102 and 104 with access to a network 110 (e.g., the Internet and/or other network). FIG. 1 further illustrates a TRP TX beam training procedure being performed in order to find suitable TRP TX beam for each of UE 102 and UE 104. As illustrated, during the procedure, UEs 102/104 employ wide beams 191 and 192, respectively, in order to generate as omni-directional coverage as possible, and in this way give a fair evaluation of the different TRP TX beams 180.

Figure 2:
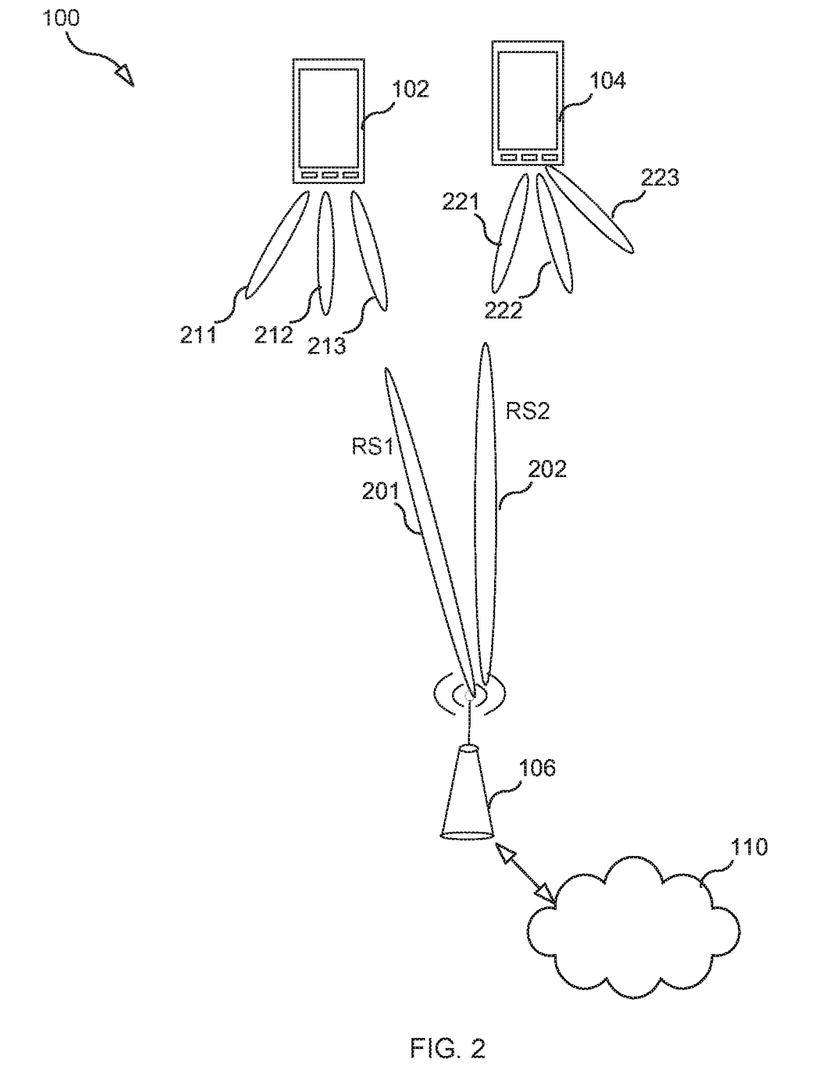
FIG. 2 illustrates an RX beam training procedure.

After the TRP TX beams have been found, a UE RX beam training procedure is performed by UE 102 and UE 104 so that each of the UEs selects a suitable UE RX beam. This is illustrated in FIG. 2. Referring to FIG. 2, network node 106 repeatedly transmits a reference signal (e.g., a CSI-RS) in the TRP TX beam 201 chosen for UE 102, thereby enabling UE 102 to evaluate different UE RX beams e.g., UE RX beams 211, 212, and 213). Similarly, for UE 104, network node 106 repeatedly transmits a reference signal (e.g., a CSI-RS) in the TRP TX beam 202 chosen for UE 104, thereby enabling UE 104 to evaluate different UE RX beams (e.g., UE RX beams 221, 222, and 223).

In a conventional UE RX beam training procedure, the UEs determines which of the candidate RX beams is the best RX beam based solely on a measurement of the power of the received reference signal (e.g., an RSRP measurement, as is known in the art), and hence choose the UE RX beams pointing towards network node 106. Specifically, UE 102 would choose beam 213 and UE 104 would choose beam 221. These chosen beams, however, may be sub-optimal because they may be more likely than another one of the candidate beams to suffer inter-user interference in the case of MU-MIMO transmission.

To overcome this problem, network node 106 performs the UE beam training for the two UEs jointly. That is, for example, network node 106 repeatedly transmits a first reference signal (RS1) on beam 201 simultaneously with transmitting a second reference signal (RS2) on beam 102, and each UE is configured with information such that UE 102 will treat RS2 as interference and UE 104 will treat RS1 as interference. RS1 and RS2 may be the same or different reference signal, but they are transmitted using different resources (e.g., different subcarriers).

Each UE 102/104 can, in this case, use these two reference signals (RS1 and RS2) to determine the best UE RX beam from the set of candidate RX beams. For example, each UE can select the UE RX beam that produces the highest estimated. SINR from the two TRP TX beams instead of only highest RSRP, which can improve MU-MIMO performance. In such a scenario, UE 102 may choose RX beam 212 as the best beam instead of beam 213, and UE 104 may choose RX beam 222 instead of beam 221. That is, the two UEs may choose UE RX beams that partly points away from the network node in order to reduce the inter-user interference. For instance, this situation may arise when there is a strong reflection in a direction different than from the line-of-sight (LOS) direction to the TRP of network node 106.

Figure 3:
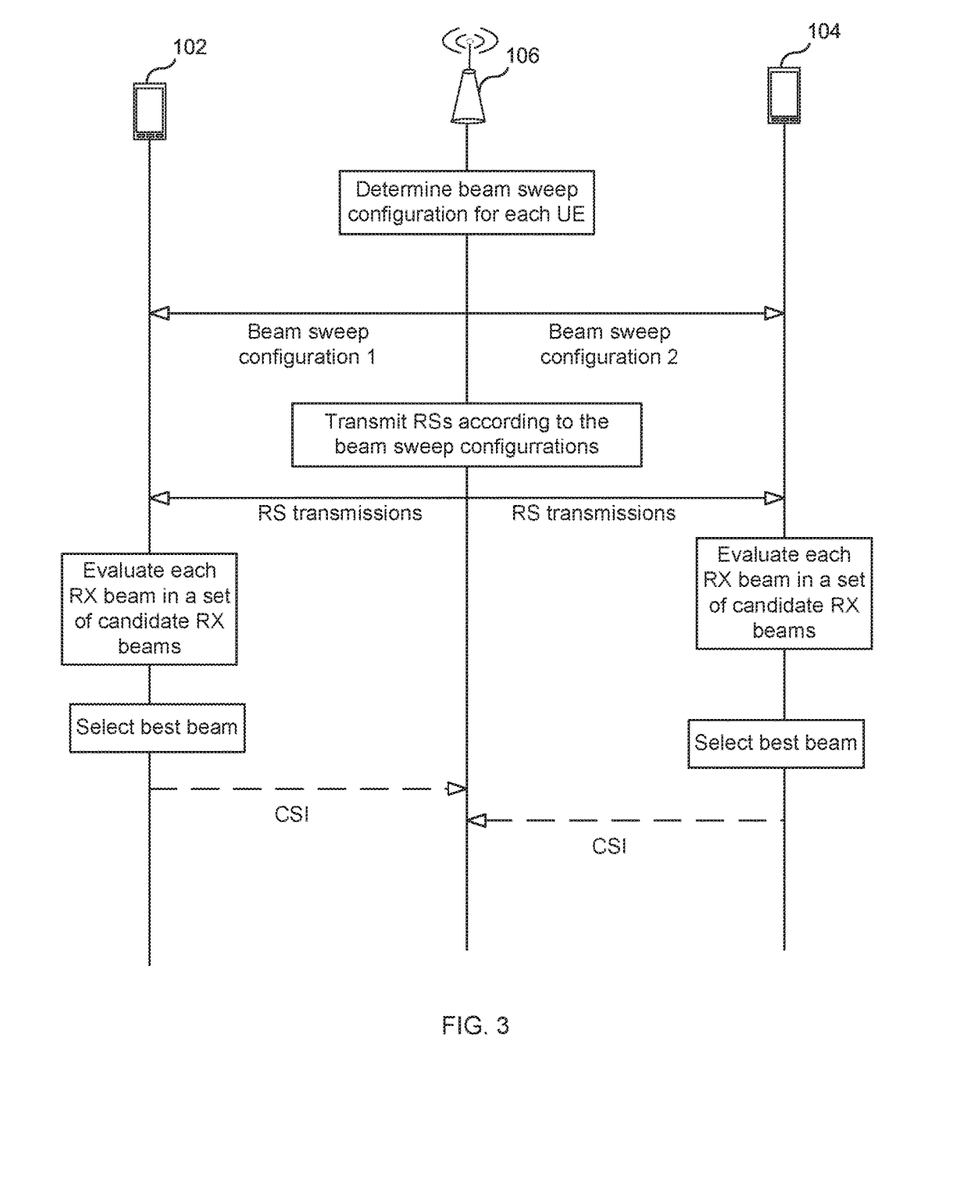
FIG. 3 is a message flow diagram according to one embodiment.

As the above illustrates, each respective UE must know which reference signal(s) should be considered as interference and which should not. In some embodiments, this is accomplished by having the network node 106 provide this information to the UEs 102 and 104, as is illustrated in FIG. 3. In other embodiments, this information may be preconfigured in the UEs.

As shown in FIG. 3, network node 106 determines a beam sweep configuration for each of the UEs. Next, network node 106 transmits to UE 102 a first beam sweep configuration message ("beam sweep configuration 1") that contains information indicating which out of two reference signals (RS1 and RS2) UE 102 should consider as interference and which should not be considered as interference, and also transmits to UE 104 a second beam sweep configuration message ("beam sweep configuration 2") that contains information indicating which out of the two reference signals UE 104 should consider as interference and which should not be considered as interference. That is, for example, the first beam sweep configuration message includes information that a) identifies a resource that is used to transmit RS2 and b) causes the UE 102 to treat the RS2 as an interfering signal, and the second beam sweep configuration message includes information that a) identifies a resource that is used to transmit RS1 and b) causes the UE 104 to treat the RS1 as an interfering signal.

Each beam sweep configuration message may also contain information about how many times these two RSs are repeated, in order for each of the UEs to know how many different UE RX beams it can evaluate (i.e., so each UE can determine the number of UE RX beams that should be included in the set of candidate RX beams).

In the next step, according to the beam sweep configurations, the network node 106 transmits the two RSs simultaneously (e.g., the two RSs may be transmitted in the same subframe, slot or symbol), and each UE performs its UE RX beam sweep. During the UE RX beam sweep, each UE evaluates each RX beam included in the set of candidate beams. In this scenario, when a UE evaluates an RX beam, the UE performs measurements (e.g., power measurements) on both transmitted RSs (RS1 and RS2) and uses these two power measurements to calculate a value (e.g., an SINR value) that is then assigned to the RX beam being evaluated. After all of the candidate RX beams are evaluated, the "best" RX beam is selected. For example, the UE compares the values assigned to each RX beam and selects the RX beam having the highest assigned value (e.g., the RX beam that produced the highest SINR). In an optional step, the UEs signal back to the network node 106 channel state information (CSI) for the chosen UE RX beam. Based on this CSI, the network node can determine a modulation and coding scheme (MCS), rank, etc. for the upcoming MU-MIMO transmission.

Figure 4:
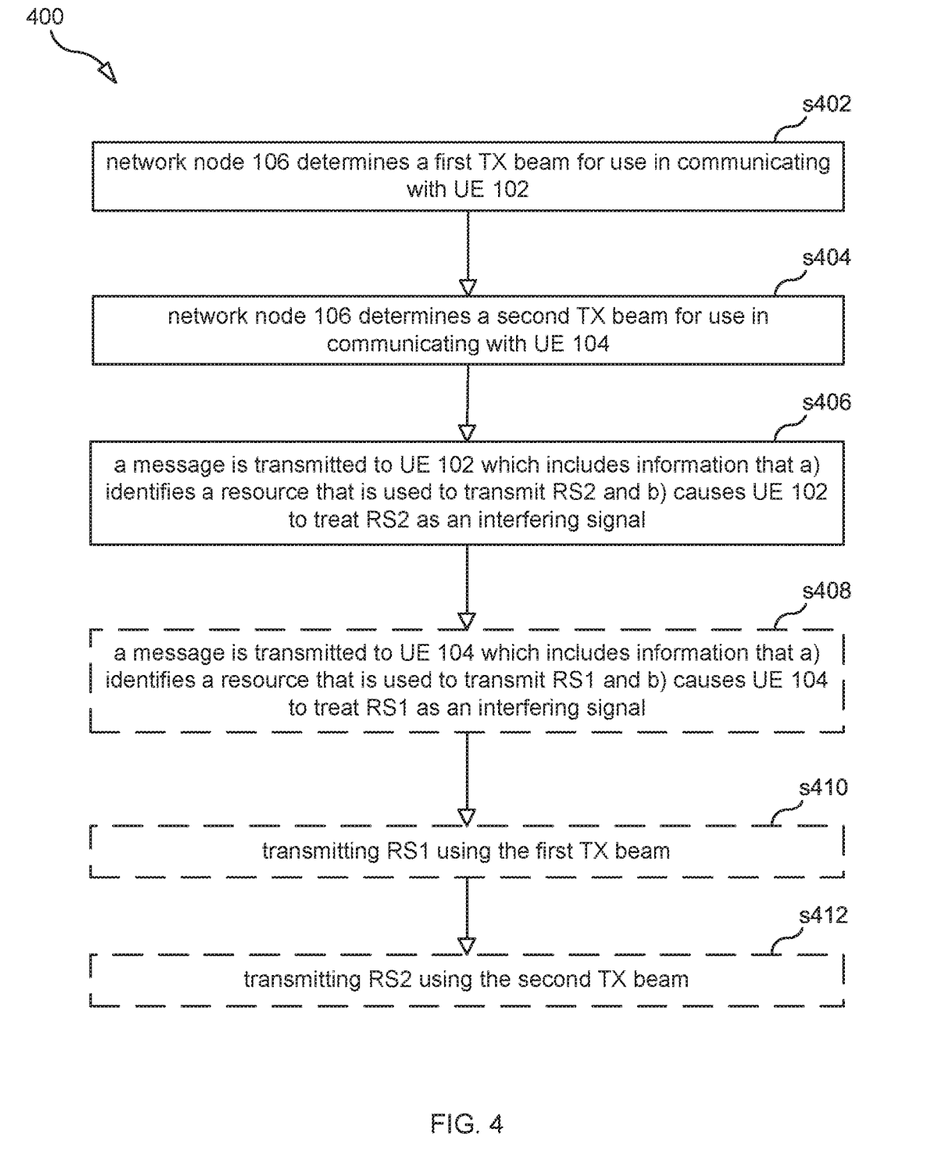
FIG. 4 is a flow chart illustrating a process according to one embodiment.

FIG. 4 is a flow chart illustrating a process 400 according to some embodiments. Process 400 may begin with step s402, in which network node 106 determines a first TX beam for use in communicating with UE 102. In step s404, network node 106 determines a second TX beam for use in communicating with UE 104. In step s406, a message is transmitted to UE 102, which message includes information that a) identifies a resource that is used to transmit RS2 (e.g., a CSI-RS) and b) causes UE 102 to treat RS2 as an interfering signal.

In some embodiments, the message further comprises information that a) identifies a resource (e.g., one or more resource elements (REs)) that is used to transmit RS1 (e.g., a CSI-RS) and b) causes UE 102 to not treat RS1 as an interfering signal. In some embodiments, the first message is one of: i) a first downlink control information (DCI) message transmitted using a physical downlink control channel (PDCCH), ii) a first Radio Resource Control (RRC) message, and iii) a first Media Access Control (MAC) message.

In some embodiments, the method also includes transmitting to UE 104 a message comprising information that a) identifies the resource that is used to transmit RS1 and b) causes UE 104 to treat RS1 as an interfering signal (step s408). In some embodiments, the message sent to UE 104 further comprises information that a) identifies the resource that is used to transmit RS2 and b) causes the UE 104 to not treat RS2 as an interfering signal.

In some embodiments, the method also includes transmitting RS1 using the first TX beam (step s410) and transmitting RS2 using the second TX beam (step s412), wherein RS1 and RS2 are transmitted simultaneously (e.g., transmitted in the same symbol).

Figure 5:
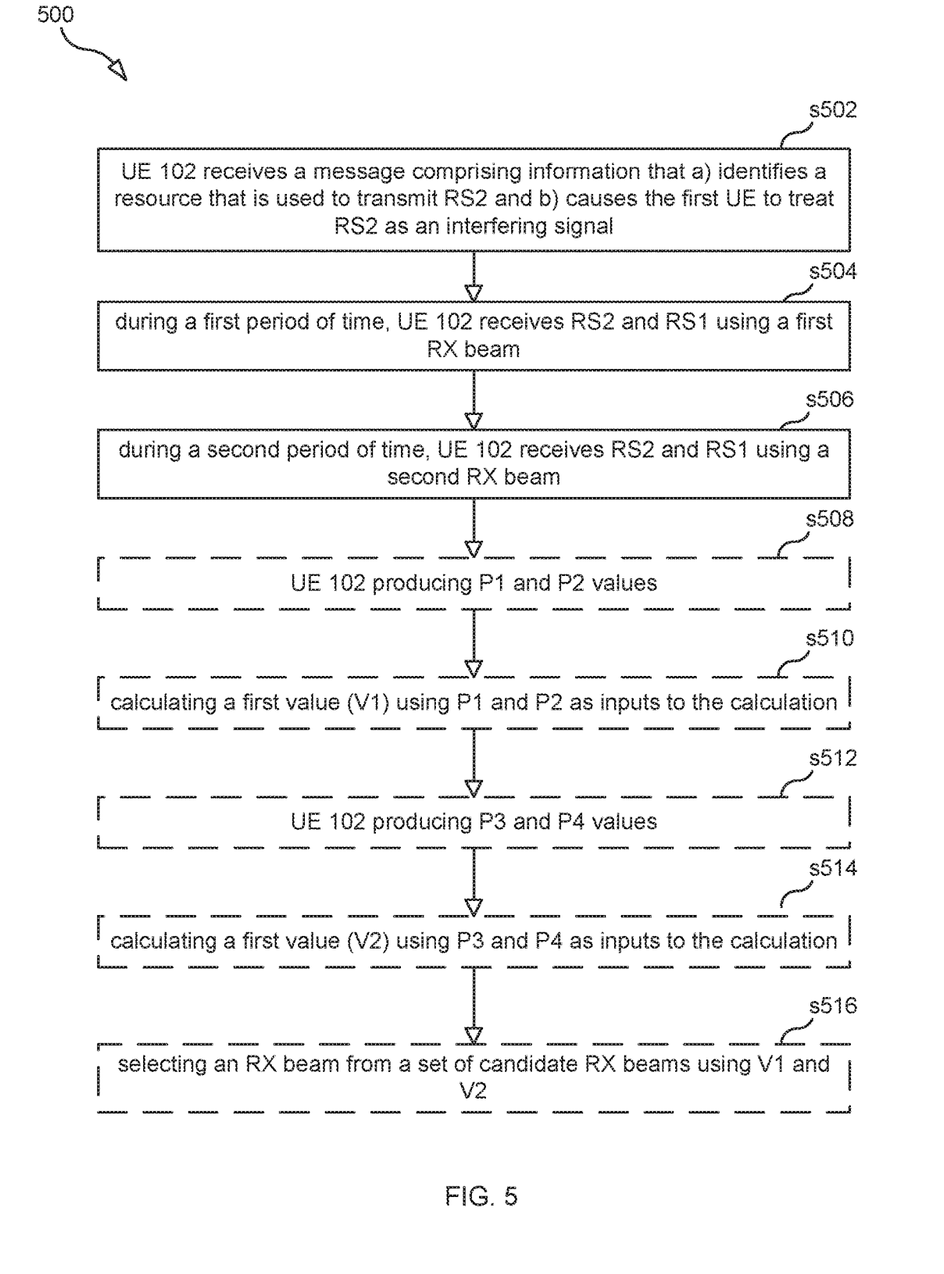
FIG. 5 is a flow chart illustrating a process according to one embodiment.

FIG. 5 is a flow chart illustrating a process 500, according to some embodiments, that is performed by UE 102. Process 500 may begin with step s502, in which UE 102 receives a message comprising information that a) identifies a resource that is used to transmit RS2 and b) causes UE 102 to treat RS2 as an interfering signal. In some embodiments, the message further comprises information that a) identifies a resource that is used to transmit RS1 and b) causes the UE 102 to not treat RS1 as an interfering signal (i.e., UE 102 treats RS1 as a beam training RS). The message may be one of: i) a first downlink control information message transmitted using a physical downlink control channel, ii) a first Radio Resource Control message, and iii) a first Media Access Control message.

In other embodiments, process 500 may start with step s504, in which, during a first period of time, UE 102 receives RS2 and RS1 using a first RX beam, wherein during the first time period a first TX beam was used to transmit RS1 and a second TX beam was used to transmit RS2. Next (step s506), during a second period of time, UE 102 receives RS2 and RS1 using a second RX beam, wherein during the second time period the first TX beam was used to transmit RS1 and the second TX beam was used to transmit RS2.

In some embodiments, process 500 further includes: UE 102 producing a first power value (P1), indicative of the power of RS1 received using the first RX beam and producing a second power value (P2), indicative of the power of RS2 received using the first RX beam (step s508); UE 102 calculating a first value (V1) using P1 and P2 as inputs to the calculation (step s510); and UE 102 selecting an RX beam from a set of candidate RX beams (step s516), wherein said set of candidate RX beams includes the first RX beam. In this embodiments, in step s516, UE 102 selects the RX beam from the set of candidate RX beam using, at the least, V1.

In some embodiments, process 500 further includes: UE 102 producing a third power value (P3) indicative of the power of RS1 received using the second RX beam and a fourth power value (P4) indicative of the power of RS2 received using the second RX beam (step s512); and UE 102 calculating a second value (V2) using P3 and P4 as inputs to the calculation (step s514). In this embodiment, in step s516, UE 102 selects the RX beam from the set of candidate RX beams using both V1 and V2, wherein said set of candidate RX beams further includes the second RX beam. In some embodiments selecting an RX beam from the set of candidate RX beams using both V1 and V2 comprises comparing V1 with V2. In some embodiments, the power values (P1-P4) produced by UE 102 are RSRP values. That is, for example, UE 102 produces P1 by determining the RSRP of RS1 and produces P2 by determining the RSRP of RS2.

In some embodiments, calculating V1 comprises calculating V1=P1/(P2+N1), wherein N1 is a determined noise value and N1 is greater than or equal to zero; and calculating V2 comprises calculating V2=P3/(P4+N2), wherein N2 is a determined noise value and N2 is greater than or equal to zero. That is, in some embodiments, each of V1 and V2 is an SINR value.

In some embodiments, selecting an RX beam from the set of candidate RX beams using both V1 and V2 comprises: comparing V1 with V2 to determine which is greater; and performing one of: i) selecting the first RX beam as a result of determining that V1 is greater than V2 and ii) selecting the second RX beam as a result of determining that V2 is greater than V1.

Figure 6:
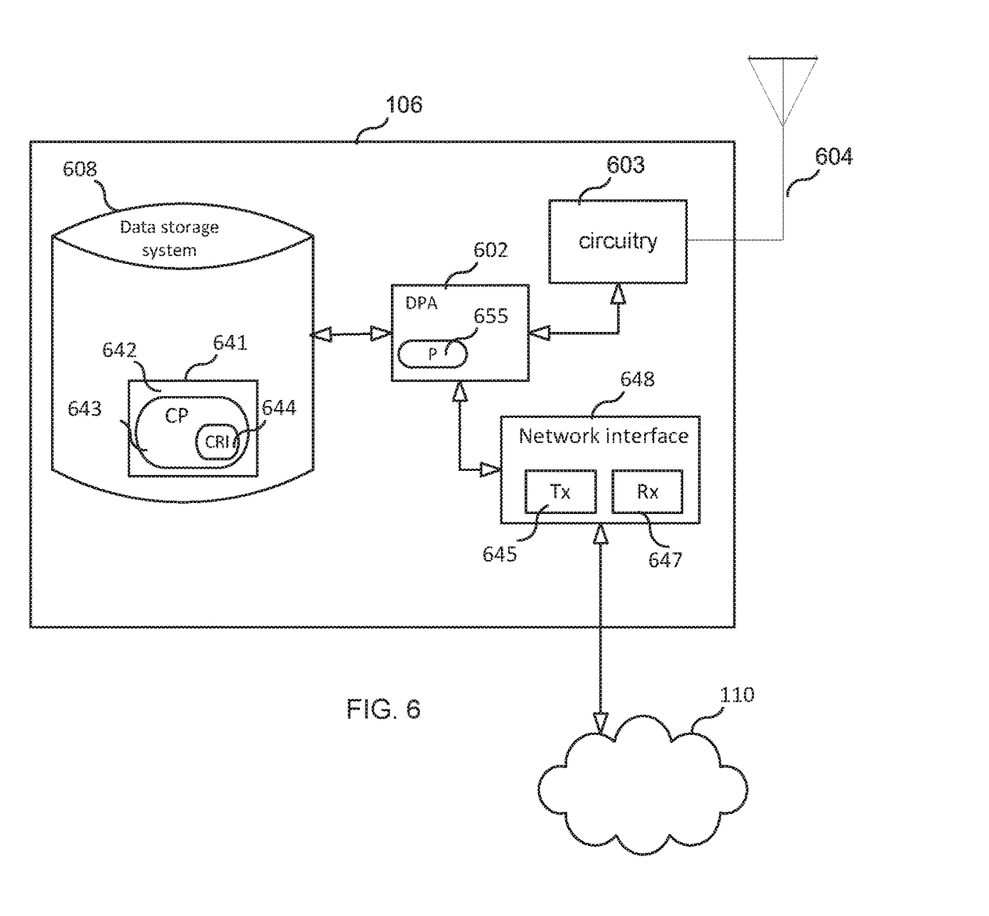
FIG. 6 is a block diagram of a network node according to one embodiment

FIG. 6 is a block diagram of network node 106 according to some embodiments. As shown in FIG. 6, network node 106 may comprise: a data processing apparatus (DPA) 602, which may include one or more processors (P) 655 (e.g., a general purpose microprocessor and/or one or more other processors, such as an application specific integrated circuit (ASIC), field-programmable gate arrays (FPGAs), and the like); a network interface 648 comprising a transmitter (Tx) 645 and a receiver (Rx) 647 for enabling the network node to transmit data to and receive data from other nodes connected to network 110 (e.g., an Internet Protocol (IP) network) to which network interface 648 is connected; circuitry 603 (e.g., radio transceiver circuitry) coupled to an antenna system 604 for wireless communication with UEs); and local storage unit (a.k.a., "data storage system") 608, which may include one or more non-volatile storage devices and/or one or more volatile storage devices (e.g., random access memory (RAM)). In embodiments where DPA 602 includes a general purpose microprocessor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, but not limited, to magnetic media (e.g., a hard disk), optical media, memory devices (e.g., random access memory), and the like. In some embodiments, the CRI 644 of computer program 643 is configured such that when executed by data processing apparatus 602, the CRI causes network node 106 to perform steps described herein (e.g., steps described herein with reference to the flow charts and/or message flow diagrams). In other embodiments, network node 106 may be configured to perform steps described herein without the need for code. That is, for example, DPA 602 may consist merely of one or more ASICs. Hence, the features of the embodiments described herein may be implemented in hardware and/or software.

Figure 7:
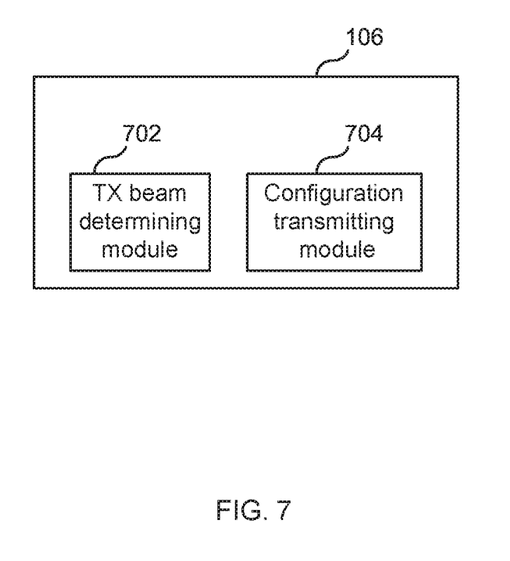
FIG. 7 is a diagram showing functional modules of a network node according to one embodiment.

FIG. 7 is a diagram showing functional modules of network node 106 according to some embodiments. As shown in FIG. 7, the network node 106 includes TX beam determining module (702) configured to determine: i) a first TX beam for use in communicating with a E 102 and ii) a second TX beam for use in communicating with UE 104. Network node 106 also includes a configuration transmitting module 704 configured to employ a transmitter to transmit to UE 102 a first message comprising information that a) identifies a resource that is used to transmit a reference signal (RS2) and b) causes UE 102 to treat RS2 as an interfering signal.

Figure 8:
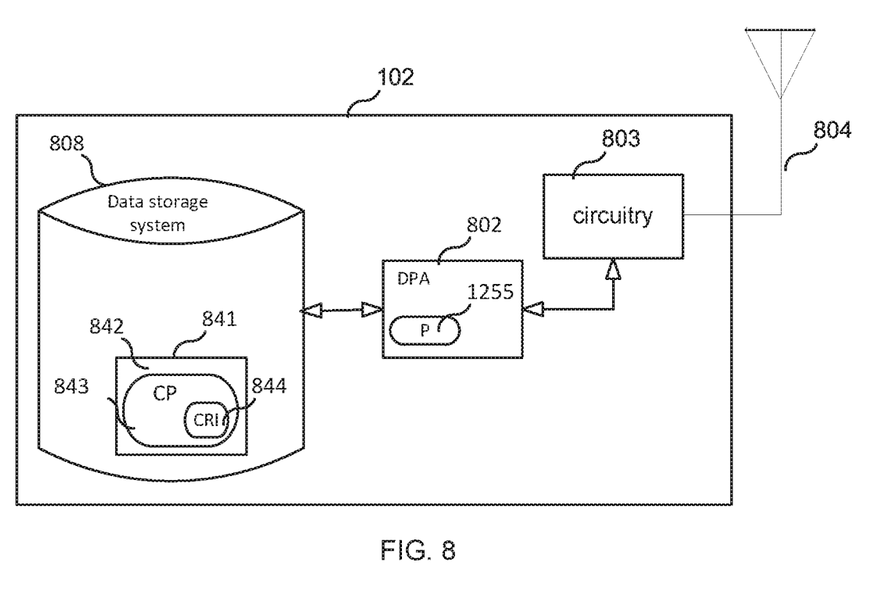
FIG. 8 is a block diagram of a UE according to one embodiment.

FIG. 8 is a block diagram of UE 102 according to some embodiments. As shown in FIG. 8, UE 102 may comprise: a data processing apparatus (DPA) 802, which may include one or more processors (P) 855 (e.g., a general purpose microprocessor and/or one or more other processors, such as an application specific integrated circuit (ASIC), field-programmable gate arrays (FPGAs), and the like); a network interface 848 comprising a transmitter (Tx) 845 and a receiver (Rx) 847 for enabling the network node to transmit data to and receive data from other nodes connected to network 110 (e.g., an Internet Protocol (IP) network) to which network interface 848 is connected; circuitry 803 (e.g., radio transceiver circuitry) coupled to an antenna system 804 for wireless communication with UEs); and local storage unit (a.k.a., "data storage system") 808, which may include one or more non-volatile storage devices and/or one or more volatile storage devices (e.g., random access memory (RAM)). In embodiments where DPA 802 includes a general purpose microprocessor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, but not limited, to magnetic media (e.g., a hard disk), optical media, memory devices (e.g., random access memory), and the like. In some embodiments, the CRI 844 of computer program 843 is configured such that when executed by data processing apparatus 802, the CRI causes UE 102 to perform steps described herein (e.g., steps described herein with reference to the flow charts and/or message flow diagrams). In other embodiments, UE 102 may be configured to perform steps described herein without the need for code. That is, for example, DPA 802 may consist merely of one or more ASICs. Hence, the features of the embodiments described herein may be implemented in hardware and/or software.

Figure 9:
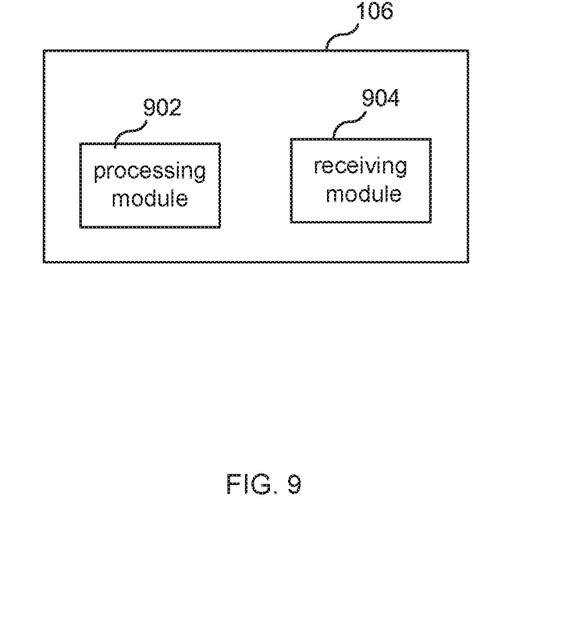
FIG. 9 is a diagram showing functional modules of a UE according to one embodiment.

FIG. 9 is a diagram showing functional modules of UE 102 according to some embodiments. As shown in FIG. 9, UE 102 includes a processing module 902 configured to process a message transmitted by network node 106, the message comprising information that a) identifies a resource that is used to transmit a reference signal (RS2), and b) causes UE 102 to treat RS2 as an interfering signal. UE 102 also includes a receiving module 904 configured to: i) receive, during a first period of time, RS2 and another RS (RS1) using a first RX beam, wherein during the first time period a first TX beam was used to transmit RS1 and a second TX beam was used to transmit RS2, and ii) receive, during a second period of time, RS1 and RS2 using a second RX beam, wherein during the second time period the first TX beam was used to transmit RS1 and the second TX beam was used to transmit RS2.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for beam management, the method comprising:
   a network node determining a first transmit (TX) beam for use in communicating with a first user equipment (UE);
   the network node determining a second TX beam for use in communicating with a second UE; and
   performing a procedure to allow the first UE to evaluate different receive (RX) beams and to select an RX beam for use by the first UE in receiving signals transmitted by the network node, wherein the procedure comprises:
   transmitting to the first UE a first message comprising information that a) identifies a resource that will be used to transmit a channel state information reference signal, CSI-RS2, for a second UE, b) causes the first UE to treat CSI-RS2 for the second UE as an interfering signal, c) identifies a resource that will be used to transmit another channel state information reference signal (CSI-RS), CSI-RS1, and d) causes the first UE to not treat CSI-RS1 as an interfering signal;
   transmitting CSI-RS1 using the first TX beam; and
   transmitting CSI-RS2 using the second TX beam.

2. The method of claim 1, wherein the first message is one of: i) a first downlink control information, DCI, message transmitted using a physical downlink control channel, PDCCH, ii) a first Radio Resource Control message, and iii) a first Media Access Control message.

3. The method of claim 1, further comprising:
   transmitting to the second UE a second message comprising information that a) identifies the resource that is used to transmit CSI-RS1 and b) causes the second UE to treat CSI-RS1 as an interfering signal.

4. The method of claim 3, wherein the second message further comprises information that a) identifies the resource that is used to transmit CSI-RS2 and b) causes the second UE to not treat CSI-RS2 as an interfering signal.

5. The method of claim 1,
   wherein
   CSI-RS1 and CSI-RS2 are transmitted during the same symbol.

6. A computer program product comprising a non-transitory computer readable medium storing a computer program comprising instructions which, when executed on at least one processor, causes the at least one processor to carry out the method according to claim 1.

7. The method of claim 1, wherein the information identifying a resource that is used to transmit CSI-RS2 identifies a subcarrier that is used to transmit CSI-RS2.

8. The method of claim 1, wherein the information identifying a resource that is used to transmit CSI-RS2 identifies a resource element (RE) that is used to transmit CSI-RS2.

9. A network node, the network node comprising:
   a local storage unit; and
   a data processing apparatus coupled to the local storage unit, wherein the data processing apparatus is configured to:
   determine a first transmit, TX, beam for use in communicating with a first user equipment, UE;
   determine a second TX beam for use in communicating with a second UE; and
   perform a procedure to allow the first UE to evaluate different receive (RX) beams and to select an RX beam for use by the first UE in receiving signals transmitted by the network node, wherein the procedure comprises:
   transmitting to the first UE a first message comprising information that a) identifies a resource that will be used to transmit a channel state information reference signal, CSI-RS2, for a second UE, b) causes the first UE to treat CSI-RS2 for the second UE as an interfering signal, c) identifies a resource that will be used to transmit another channel state information reference signal (CSI-RS), CSI-RS1, and d) causes the first UE to not treat CSI-RS1 as an interfering signal;
   transmitting CSI-RS1 using the first TX beam; and
   transmitting CSI-RS2 using the second TX beam.

10. The network node of claim 9, wherein the network node is configured to:
    transmit to the second UE a second message comprising information that a) identifies the resource that is used to transmit CSI-RS1 and b) causes the second UE to treat CSI-RS1 as an interfering signal.

11. The network node claim 9, wherein the network node is configured to:
    transmit CSI-RS1 using the first TX beam; and
    transmit CSI-RS2 using the second TX beam, wherein CSI-RS1 and CSI-RS2 are transmitted in-during the same symbol.

12. A network node, the network node being adapted to:
    determine a first transmit (TX) beam for use in communicating with a first user equipment (UE);
    determine a second TX beam for use in communicating with a second UE; and
    perform a procedure to allow the first UE to evaluate different receive (RX) beams and to select an RX beam for use by the first UE in receiving signals transmitted by the network node, wherein the procedure comprises:

transmitting to the first UE a first message comprising information that a) identifies a resource that will be used to transmit a channel state information reference signal, CSI-RS2, for a second UE, b) causes the first UE to treat CSI-RS2 for the second UE as an interfering signal, c) identifies a resource that will be used to transmit another channel state information reference signal (CSI-RS), CSI-RS1, and d) causes the first UE to not treat CSI-RS1 as an interfering signal;

transmitting CSI-RS1 using the first TX beam; and
transmitting CSI-RS2 using the second TX beam.

13. A method for beam management performed by a user equipment, UE, the method comprising:
receiving a message transmitted by a network node, the message comprising information that a) identifies a resource that is used to transmit a reference signal, RS2, and b) causes the UE to treat RS2 as an interfering signal;
during a first period of time, receiving RS2 and another RS, RS1, using a first receive, RX, beam which points in a first direction, wherein during the first time period a first TX beam was used to transmit RS1 and a second TX beam was used to transmit RS2; and
during a second period of time, receiving RS2 and RS1 using a second RX beam which points in a second direction that is different than the first direction, wherein during the second time period the first TX beam was used to transmit RS1 and the second TX beam was used to transmit RS2.

14. The method of claim 13, wherein the message further comprises information that a) identifies a resource that is used to transmit RS1 and b) causes the UE to not treat RS1 as an interfering signal.

15. The method of claim 13, wherein the message is one of: i) a first downlink control information, DCI, message transmitted using a physical downlink control channel, PDCCH, ii) a first Radio Resource Control, RRC, message, and iii) a first Media Access Control, MAC, message.

16. The method of claim 13, further comprising:
producing a first power value, P1, indicative of the power of the received RS1 received using the first RX beam;
producing a second power value, P2, indicative of the power of the received RS2 received using the first RX beam;
calculating a first value, V1, using P1 and P2 as inputs to the calculation; and
selecting an RX beam from a set of candidate RX beams using the calculated first value, V1, wherein said set of candidate RX beams includes the first RX beam.

17. The method of claim 16, further comprising:
producing a third power value, P3, indicative of the power of RS1 received using the second RX beam;
producing a fourth power value, P4, indicative of the power of RS2 received using the second RX beam;
calculating a second value, V2, using P3 and P4 as inputs to the calculation; and
selecting an RX beam from a set of candidate RX beams using both V1 and V2, wherein said set of candidate RX beams further includes the second RX beam.

18. The method of claim 17, wherein selecting an RX beam from the set of candidate RX beams using both V1 and V2 comprises comparing V1 with V2.

19. The method of claim 17, wherein
calculating V1 comprises calculating $V1=P1/(P2+N1)$, wherein N1 is a determined noise value and N1 is greater than or equal to zero; and
calculating V2 comprises calculating $V2=P3/(P4+N2)$, wherein N2 is a determined noise value and N2 is greater than or equal to zero.

20. The method of claim 17, wherein selecting an RX beam from the set of candidate RX beams using both V1 and V2 comprises:
comparing V1 with V2 to determine which is greater; and
performing one of: i) selecting the first RX beam as a result of determining that V1 is greater than V2 and ii) selecting the second RX beam as a result of determining that V2 is greater than V1.

21. The method of claim 16, wherein
calculating V1 comprises calculating $V1=P1/(P2+N1)$, wherein N1 is a determined noise value and N1 is greater than or equal to zero.

22. The method of claim 13, wherein
RS1 is a first channel state information RS, CSI-RS, and RS2 is a second CSI-RS.

23. A computer program product comprising a non-transitory computer readable medium storing a computer program comprising instructions which, when executed on at least one processor, causes the at least one processor to carry out the method according to claim 13.

24. A user equipment (UE), the UE comprising:
a local storage unit; and
a data processing apparatus coupled to the local storage unit, wherein the data processing apparatus is configured to:
process a message transmitted by a network node, the message comprising information that a) identifies a resource that is used to transmit a reference signal, RS2, and b) causes the UE to treat RS2 as an interfering signal;
receive, during a first period of time, RS2 and another RS, RS1, using a first receive, RX, beam which points in a first direction, wherein during the first time period a first TX beam was used to transmit RS1 and a second TX beam was used to transmit RS2; and
receive, during a second period of time, RS2 and RS1 using a second RX beam which points in a second direction that is different than the first direction, wherein during the second time period the first TX beam was used to transmit RS1 and the second TX beam was used to transmit RS2.

25. A user equipment (UE), the UE being adapted to:
process a message transmitted by a network node, the message comprising information that a) identifies a resource that is used to transmit a reference signal, RS2, and b) causes the UE to treat RS2 as an interfering signal;
receive, during a first period of time, RS2 and another RS, RS1, using a first receive, RX, beam which points in a first direction, wherein during the first time period a first TX beam was used to transmit RS1 and a second TX beam was used to transmit RS2; and
receive, during a second period of time, RS2 and RS1 using a second RX beam which points in a second direction that is different than the first direction, wherein during the second time period the first TX beam was used to transmit RS1 and the second TX beam was used to transmit RS2.

* * * * *